E. W. HURSTHOUSE.
IMPLEMENT FOR DISTRIBUTING MANURES AND THE LIKE.
APPLICATION FILED MAR. 30, 1916.
1,201,824. Patented Oct. 17, 1916.
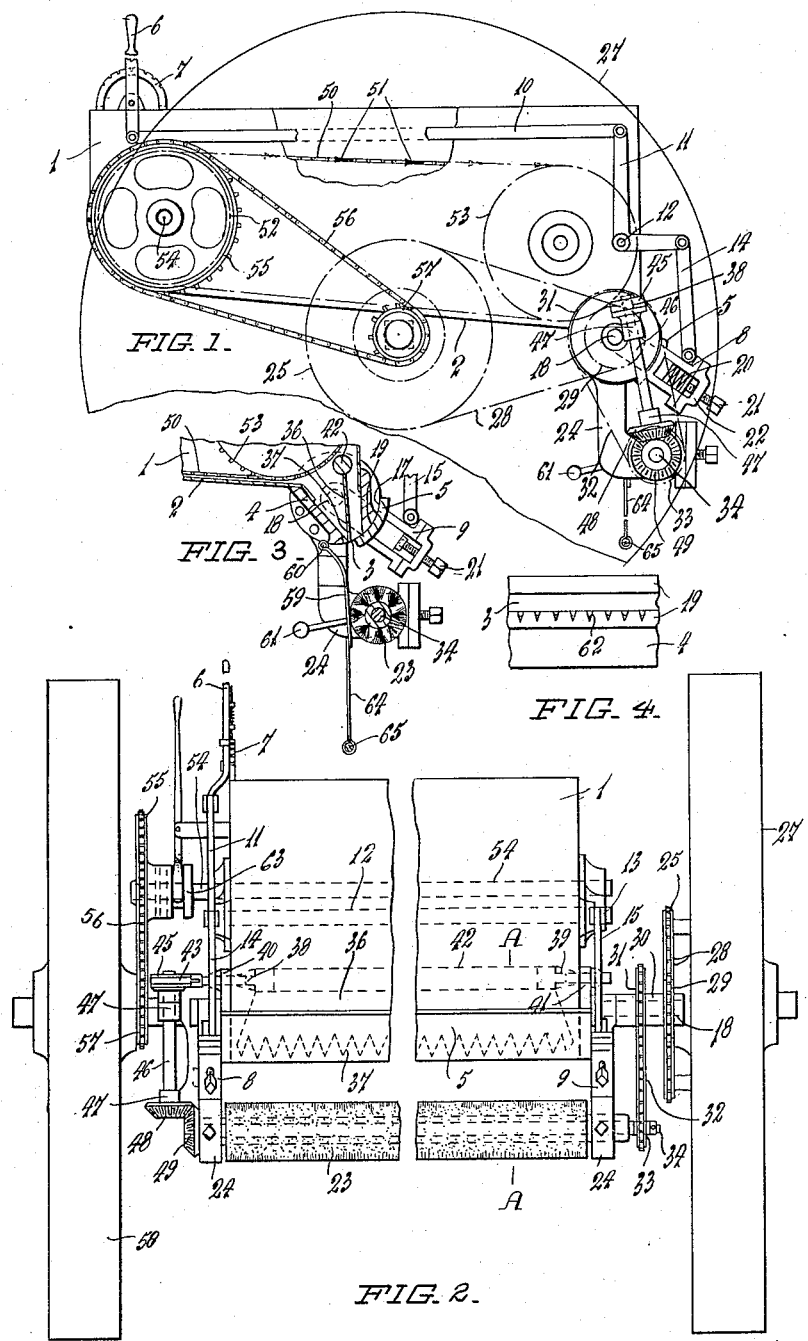
E. W. Hursthouse.
Inventor
By _____
Attorney.

UNITED STATES PATENT OFFICE.

ERNEST WILLIAM HURSTHOUSE, OF WELLINGTON, NEW ZEALAND.

IMPLEMENT FOR DISTRIBUTING MANURES AND THE LIKE.

1,201,824.

Specification of Letters Patent.

Patented Oct. 17, 1916.

Application filed March 30, 1916. Serial No. 87,679.

*To all whom it may concern:*

Be it known that I, ERNEST WILLIAM HURSTHOUSE, a citizen of the Dominion of New Zealand, and residing at Main street, Lower Hutt, Wellington, in the Provincial District of Wellington, in the Dominion of New Zealand, have invented certain new and useful Improvements in Implements for Distributing Manures and the like, of which the following is a specification.

This invention relates to carts or implements used for distributing manure and provides means whereby liquid manure or dry manure and the like are distributed in a better manner than heretofore.

The invention consists of a cart having a bottom sloping toward the distributing mechanism which is the special feature of my invention. An opening is made across the back of the cart and a mouthpiece is fitted to this opening. A valve or slide adapted to close the mouthpiece is operable by a lever and rods for the purpose of regulating the opening of the mouthpiece. The valve is carried in frames or arms pivoted upon a shaft, the center of which is coincident with the center of the curved face. Operating rods are connected to the frames. The valve is held up to this face by a spring or by a screw, guides being provided in the frame whereon the valve is slidable. A rotating brush is mounted in brackets and is driven by a sprocket pinion and chain, which receive motion from a sprocket wheel mounted on the axle which forms the pivot of the frame, this axle in turn, receiving its motion by a chain, from a sprocket wheel fixed to the carrying wheel of the implement. The bristles of the brush may be wire, brass or rubber, or metal plates, and operate below the opening of the mouthpiece. In some cases it is necessary or desirable to use an agitator and for this purpose I provide a bar inside the cart and near the mouthpiece. This bar has projecting spikes or wires and receives reciprocating lateral motion from an eccentric. To prevent manure, lime, or the like from being blown away after leaving the mouthpiece, a screen made of sheet iron is provided below the mouthpiece. This screen is hinged in order to yield and has a sheet of canvas held taut by an iron rod; or the screen may be made of yielding material such as canvas. The cart is provided with a screen through which the manure, lime or the like is passed before going into the cart.

The drawing herewith illustrates the invention.

Figure 1, is a side elevation, and Fig. 2, a rear elevation of the implement, Fig. 3, is a sectional elevation on line A—A Fig. 2, and Fig. 4, is an inverted plan of part of a mouthpiece.

The implement comprises a cart having a body 1 with a sloping bottom 2, the lower end of which has an opening or port 3 communicating with the distributing mechanism to be described.

The opening 3 extends across the full width of the body 1; and a mouthpiece 4, also extending the full width of the said body, is fitted to the opening 3. A valve or slide 5 consisting of a plate is adapted to close the mouthpiece 4 and is operable by a lever 6 within easy reach of the driver of the implement. The lever has a quadrant rack 7, whereby it may be held in any desired position. The lever is connected to frames or arms 8 and 9, by a rod 10, a bell crank lever 11 fixed to one end of a shaft 12, an arm 13 fixed to the other end of the shaft, and links 14 and 15, connected to the bell crank lever and the arm 13 respectively.

The valve 5 has a curved face 17 and its ends are slidable in the frames 8 and 9, which are pivoted upon shafts or studs 18, the face 19 of the mouthpiece being curved to correspond to the face 17. The center of the curved faces 17 and 19 is co-incident with the center of the shaft 18. The valve 5 is held in contact with the face 19 by springs 20, the pressure exerted by which is regulated by means of screws 21 which are screwed through caps 22 of the frames 8 and 9 and bear upon the ends of the valve. In Fig. 3 the spring 20 is dispensed with and the screw 21 bears directly upon the end of the valve.

A brush 23 below, and extending the full width of the mouthpiece 4, is mounted in brackets 24 integral with, or attached to, the said mouthpiece. The brush is rotated by a sprocket wheel 25 fixed to a carrying wheel 27 of the implement. The motion of the wheel 25 is communicated by a sprocket chain 28 to a sprocket pinion 29 fixed to a sleeve 30 whereon is also fixed a sprocket wheel 31 from which the motion is communicated by a sprocket chain 32 to a sprocket pinion 33 fixed to the shaft 34 of the brush. The sleeve 30 is mounted upon a shaft or stud 18.

An agitator 36 comprising a bar or plate having spikes or teeth 37 is carried by pintles 38 and 39, which are slidable laterally in brackets 40 and 41 respectively and are screwed into a headstock 42 to which the plate is fixed. The pintle 40 is connected to an eccentric strap 43 fitting an eccentric 45 fixed upon a shaft 46, which is mounted in lugs 47 projecting from the frame 8. The shaft 46 is rotated by a bevel pinion 48, which is driven by a bevel wheel 49 fixed to the shaft 34. The eccentric imparts lateral reciprocal motion to the agitator.

A screen, which also acts as a conveyer, is provided in the interior of the body 1. The screen consists of endless belts or chains 50 carrying laths or iron strips 51, through which the material to be distributed passes and is conveyed to the edge of the mouthpiece 4. The belts 50 pass around, and receive motion from pulleys or sprocket wheels 52 and 53. The shaft 54 of the pulley or sprocket wheel 52 is provided with a sprocket pinion 55, which receives motion by means of a sprocket chain 56 from a sprocket wheel 57 fixed to a carrying wheel 58 of the implement. A clutch 63 is provided for throwing the pinion 55 into gear when it is desired to rotate the screen.

To prevent lime or the like from being blown away after leaving the mouthpiece 4, a plate 59 is hinged by pintles 60 to the brackets 24. The said plate is pressed against the brush 23 by a weight 61. A sheet of canvas 64 is attached to the plate and is held taut by an iron rod 65.

The material to be distributed passes through the laths or iron strips 51 and is conveyed to the edge of the mouthpiece 4 into which it falls and wherein it is kept in movement by the agitator 36 and thereby caused to fall into the mouthpiece 4. The teeth 37 of the agitator descend to the bottom of the mouthpiece and are just clear of the valve 5 when the latter is closed. The material falls from the mouthpiece on to the brush 23, which rotates rapidly and drives the material down the face of the plate 59 with considerable force. The driving of the material in the above manner and the protection from the wind afforded by the plate result in preventing loss of material.

When liquid manure or the like is to be distributed the valve 5 is lowered to leave a small opening only in the mouthpiece 4 and the face 19 of the mouthpiece is provided with transverse grooves 62, which cause the manure or the like to flow away evenly distributed.

What I do claim and desire to secure by Letters Patent of the United States is:—

1. An implement for distributing manure and the like, comprising a cart having a body with a hole across the bottom thereof, a mouthpiece to the hole and having a curved face, pivoted frames having slides the center of the pivots being coincident with the center of the curved face, a valve having a face curved to correspond to the curved face of the mouthpiece, and springs pressing the valve against the mouthpiece, substantially as set forth.

2. An implement for distributing manure and the like, comprising a cart having a body with a hole across the bottom thereof, a mouthpiece to the hole and having a curved face, pivoted frames having slides the center of the pivots being coincident with the center of the curved face, a valve slidable in the frames and having a face curved to correspond to the curved face of the mouthpiece, caps upon the frames and screws passing through the caps and pressing the valve against the mouthpiece, substantially as set forth.

3. An implement for distributing manure and the like, comprising a cart having a body with a hole across the bottom thereof, a mouthpiece to the hole, a valve adapted to close the said mouthpiece, an agitator having teeth within the mouthpiece, and an eccentric driven by a carrying wheel of the implement and reciprocating the agitator, substantially as set forth.

4. An implement for distributing manure and the like, comprising a cart having a body with a hole across the bottom thereof, a mouthpiece to the hole, a valve adapted to close the said mouthpiece, and a traveling screen within the said body, substantially as set forth.

5. An implement for distributing manure and the like, comprising a cart having a body with a hole across the bottom thereof, a mouthpiece to the hole and having transverse grooves in its face and a valve adapted to close the said mouthpiece, substantially as set forth.

6. A manure distributer comprising a conveyer, a valved nozzle, an agitator in said nozzle, a plate, a revoluble brush means engaging said plate, said brush arranged to receive material from said nozzle and discharge it past the plate.

7. A manure distributer comprising a valved discharge nozzle, a brush mounted to receive material from said nozzle and a plate engaged by said brush to sweep the received material past the plate.

8. A manure distributer comprising a valved discharge nozzle, a brush mounted to receive material from said nozzle, and a plate substantially in line with said nozzle and engaged by said brush to sweep the received material past the plate.

9. A manure distributer comprising a conveyer, a valved nozzle, a reciprocating agitator in said nozzle, a plate, a revoluble brush means engaging said plate, said brush arranged to receive material from said nozzle and discharge it past the plate.

10. A manure distributer comprising a conveyer, a valved nozzle, an agitator in said nozzle, a plate, a revoluble brush means engaging said plate, said brush arranged to receive material from said nozzle and discharge it past the plate, said conveyer and agitator having operating means dependent on the travel of the manure distributer.

11. A manure distributer comprising a conveyer, a valved nozzle, an agitator in said nozzle, a plate, a revoluble brush means engaging said plate, said brush arranged to receive material from said nozzle and discharge it past the plate, and an apron to act as a shield for discharged material.

In testimony whereof I have signed my name to this specification in the presence of two witnesses.

ERNEST WILLIAM HURSTHOUSE.

Witnesses:
ERNEST SMITH BALDWIN,
EDNA JOAN COLLEY.

Copies of this patent may be obtained for five cents each, by addressing the "Commissioner of Patents, Washington, D. C."